United States Patent [19]

Häfner

[11] Patent Number: 4,644,802
[45] Date of Patent: Feb. 24, 1987

[54] FORCE MEASURING APPARATUS AND METHOD

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 718,314

[22] Filed: Apr. 1, 1985

[30] Foreign Application Priority Data

Apr. 2, 1984 [DE] Fed. Rep. of Germany ....... 3412211
Apr. 2, 1984 [DE] Fed. Rep. of Germany ....... 3412212

[51] Int. Cl.$^4$ ...................... G01L 1/26; G01G 21/02
[52] U.S. Cl. ........................... 73/862.38; 177/DIG. 9
[58] Field of Search ............... 73/147, 862.38, 862.58, 73/862.62, 862.64, 862.04; 177/DIG. 9

[56] References Cited

U.S. PATENT DOCUMENTS 3,561,554  2/1971  Merriam .............................. 177/203
3,993,149  11/1976 Harvey .............................. 73/862.64
4,213,509  7/1980  Hafner .............................. 177/DIG. 9
4,533,007  8/1985  Mosher et al. .................. 177/165 X

FOREIGN PATENT DOCUMENTS 1024753  6/1983  U.S.S.R. ........................... 73/862.58

Primary Examiner—Charles A. Ruehl
Attorney, Agent, or Firm—Armstrong, Nikaido, Marmelstein & Kubovcik

[57] ABSTRACT

An apparatus and method for measuring a force (component) includes a force receiving member guided in an essentially frictionless manner in a base member for movement in the direction of the force (component) to be measured. A force measuring device is supported on the base member for measuring the force applied to the force receiving member. Wedge means are arranged between the force receiving member and the base member connected in the direction of its axis to the force measuring device. A bias force means acts onto the wedge means in the direction of the axis of the wedge.

23 Claims, 3 Drawing Figures

4,644,802

FORCE MEASURING APPARATUS AND METHOD

FIELD OF THE INVENTION

The invention relates to a force measuring apparatus and method. The invention has particular application to a force measuring apparatus for measuring forces or force components exerted onto a force receiving member which is frictionlessly moveable in the direction of the force or force component in a base member and which transmits the force or force component to a force measuring device supported on the base member.

BACKGROUND OF THE INVENTION

The U.S. Pat. No. 4,112,752 discloses a force measuring apparatus for measuring the forces of a flowing medium, such as air flow in a wind tunnel, acting on an object where aerodynamic properties are to be investigated. The object is secured to an object carrier which is mounted in a bearing system permitting movement in the directions of the force components in vertical and mutually perpendicular horizontal directions, the object carrier being connected to a force measuring device for measuring force in each of these directions. The object carrier is supported by hydrostatic bearings so as to be moveable in the directions of the force components to be measured. As force measuring devices, strain gauge devices are used.

With this known and similar force measuring apparatus, it is often required to measure forces which vary to a considerably lower extent about a predetermined high basic value. Consequently, the range of measurement of these force measuring devices must be sufficiently large to measure such large forces, resulting in a relative inexact measurement. Known force measuring devices, in particular strain gauges, are only able to measure positive forces, i.e. forces acting in one predetermined direction but not in the opposite direction. However, wind tunnel apparatus as disclosed, for example, in U.S. Pat. No. 4,112,752 should be capable of measuring forces in two opposite directions. In known force measuring apparatus, cumbersome transmission rods and Watt levers are necessary to connect the force measuring devices to the object carrier.

SUMMARY OF THE INVENTION

It is an object of the present invention to provide a force measuring apparatus and method having improved measuring capabilities.

It is another object of the present invention to provide a force measuring apparatus and method for measuring a force or force component which may act in a first direction or in the opposite direction.

It is a further object of the present invention to provide a force measuring apparatus and method permitting a coarse and a fine mesurement.

These and other objects are achieved by an apparatus for measuring a force or force component comprising:

(a) a force receiving member arranged to have the force (component) applied thereto;

(b) a base member for guiding in an essentially frictionless manner the force receiving member for movement in the direction of the force(component) to be measured;

(c) a force measuring device surpported on the base member for measuring the force applied to the force receiving member;

(d) wedge means having opposite first and second surfaces inclined to each other and being guided in an essentially frictionless manner with its first and second surfaces between the force receiving member and the base member for movement in the direction of a wedge axis and acting onto the force measuring device in the direction of the wedge axis, the direction of the force (component) to be measured intersecting at least one of the first and second surfaces at an angle differing from 90°; and (e) bias force means acting on the wedge means at least partially in the direction of the wedge axis.

BRIEF DESCRIPTIONS OF THE DRAWINGS

Embodiments of the present invention will now be described by way of example with reference to the accompanying drawings.

Figure 1:
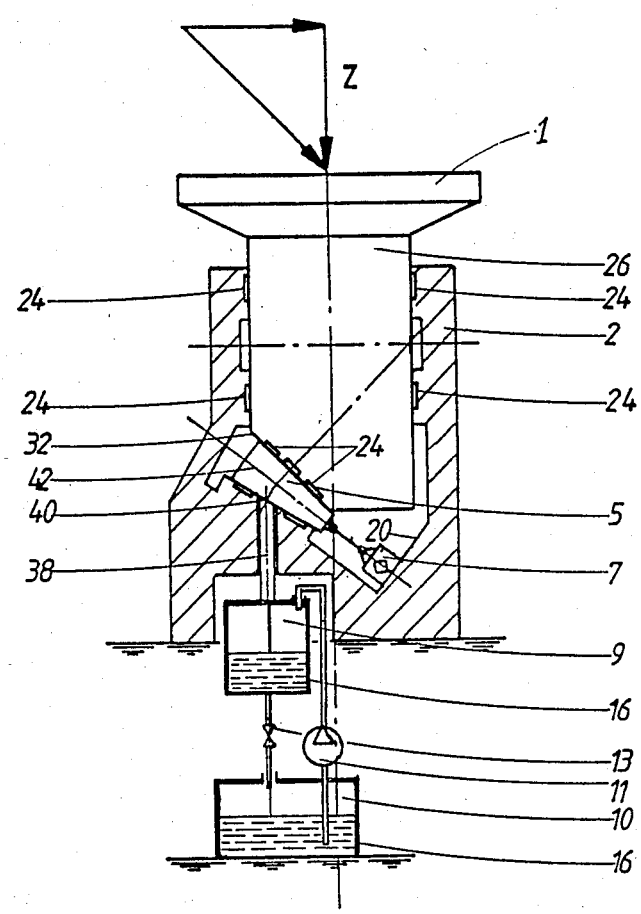
FIG. 1 is an schematic side elevational view of a force measuring apparatus suitable to use in a wind tunnel to measure the force in a vertical Z-direction.

DESCRIPTION OF PREFERRED EMBODIMENTS:

FIG. 1 shows a first embodiment of the present invention for measuring a force (component) acting in a vertical or Z direction. In a base member or frame 2, a force receiving member which exemplary consists of a rod 26 supporting a platform 1 is guided by hydrostatic bearings 24 for movement in the Z direction. An object (not shown) may be placed onto the platform and an airflow may be imposed on it. The vector Z represents the force component in the Z direction inclusive the weight of the object.

At the bottom side of rod 26 there is provided a ramp surface 32 extending over the whole diameter or preferably only part of the bottomside of the rod 26 as indicated in FIG. 1. The ramp surface 32 is in engagement with a first surface of a wedge 5 by means of further hydrostatic bearings 24. A wedge axis 42 preferably is inclined to the Z direction as is the ramp surface 32. The latter may have an angle with the Z direction between 30 to 60°, preferably 40° to 50°. With the present embodiment the ramp surface 32 has an angle with the Z direction of about 45°.

A lower second surface of the wedge 5 is, via further hydrostatic bearings, in engagement with a ramp surface provided in the interior of frame 2. In the embodiment the tapered end of the wedge 5 is directed downwards and connected to a force measuring device 7 such as a strain gauge device or any other kind of load cell. The force measuring device 7 is supported on a ramp surface in the interior of the frame 2.

It should be noted that the use of a force measuring device connected to a wedge guided in hydrostatic bearings has become known from U.S. Pat. No. 4,213,509. However, the use of the wedge in the known device is for applying a predetermined force onto an object and the wedge axis extends in a horizontal direction. The force transmission ratio of the wedge will depend on the type of application and may range between 1:5 to 1:1000 as an example.

The force transmission ratio of the wedge will in particular depend on the type of force measuring device used and the type of a bias force means to be described hereinafter. The purpose of the bias force exerted onto the wedge is to equalize the weight of the force receiving member and the object. Furthermore, a certain basic force component in the Z direction may be equalized in addition thereto. The bias force means comprise a container 9 secured to the lower second surface of the wedge 5, preferably at the center of gravity of this second surface. For equalizing or compensating all or part of the above mentioned forces container 9 may be supplied with liquid 16 from a tank 10 by means of a pump 11. This ensures a rather gradual change of the bias force by changing the weight or volume of the liquid 16 in container 9. Via a valve 13, container 9 may be emptied partially or totally into tank 16.

The operation of the force measuring apparatus according to this embodiment is as follows:

After placing the object on top of platform 1 wedge 5 is urged in the upper left direction according to FIG. 1. Container 9 is now supplied with liquid 16 until wedge 5 is returned into a position which offers the optimum measuring range for the force measuring device 7. Alternatively container 9 may be filled with a predetermined amount of liquid before placing the object onto platform 1.

Now an airflow is directed onto the object and the force measuring device 7 measures exactly the force component in Z direction. Since all basic forces are equalized by the bias force, only force changes are measured which means a considerable improvement in the measurement.

It should be noted that in view of the ratio of forces due to the wedge effect the bias force will be effected by very small masses in the range of a few kilograms for equalizing basic forces in the range of a ton or more.

The liquid for creating the bias force may be replaced by other masses, though the liquid system has the advantage of a particular exact, simple and continuous adjustment. Furthermore, the fluid used for supplying the hydrostatic bearings may be used as an equalization liquid.

The force measuring device according to the invention may be used for measuring forces in any other than the Z direction. In principle, the force receiving member may be inclined in respect to the horizontal direction; the direction of the force to be measured may even be the horizontal direction. Depending on the direction of the wedge axis the force measuring device may be provided at the tapered end of the wedge or at the opposite side. As regards the bias force means it should be arranged in such a manner that it acts to compensate or equalize certain fundamental forces. As will be described later in connection with the third embodiment, the bias force means does not only act to equalize basic or fundamental forces, but may also be used for shifting the range of measurement.

It should further be noted that the angle of inclination between the ramp surface 32 and the direction of force application influences the force transmission ratio between the force receiving member and the force measuring device. With an arrangement according to the embodiment a high rigidity is achieved at the load receiving member and a basic force equalization may be realized by very small masses.

The forces measuring apparatus according to the invention has a high resonance frequency in view of the very small displacement of the force receiving member over the whole measuring range of less than 0.02 mm. No additional damping means are necessary in view of the load directed to the hydrostatic bearing surfaces. The allover design is extremely simple and permits a force splitting without any interdependencies; the measuring and bias force ranges may be adjusted within wide limits.

The force measuring apparatus according to the invention is applicable wherever a force applied in the direction of movement of a force receiving member or a respective force component acting in this direction is to be measured exactly despite the excistance of high basic forces.

Figure 2:
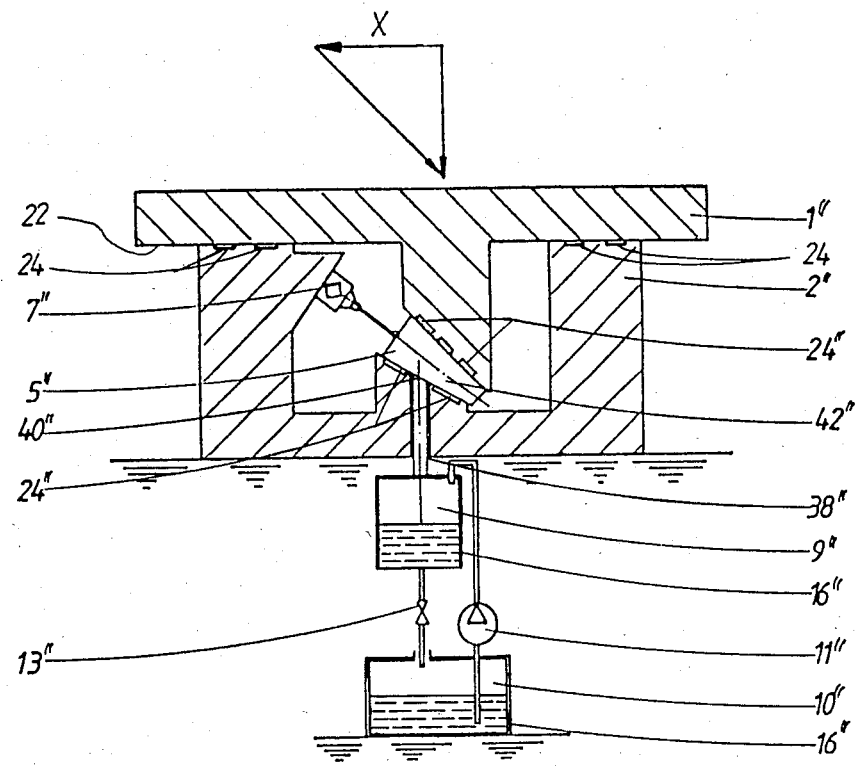
FIG. 2 is a schematic side elevational view of a force measuring apparatus suitable for measuring a force (component) directed in a horizontal X or Y direction.

FIG. 2 shows, in principle, a second embodiment for use to measure a horizontal force or force component in the X direction. The similar functional elements as in FIG. 1 are designated with similar reference numerals with apostrophes.

With this embodiment it should be noted that platform 1″ has a lower surface 22 which again engages frame 2″ via the hydrostatic bearings 24″. In practice, in order to keep the hydrostatic bearings tight it would be necessary to have a basic force exerted to platform 1″ in the X direction.

Since the function of the apparatus according to the second embodiment is similar to that of the apparatus of the first embodiment, except for the direction of the force, any further explanations are omitted.

Figure 3:
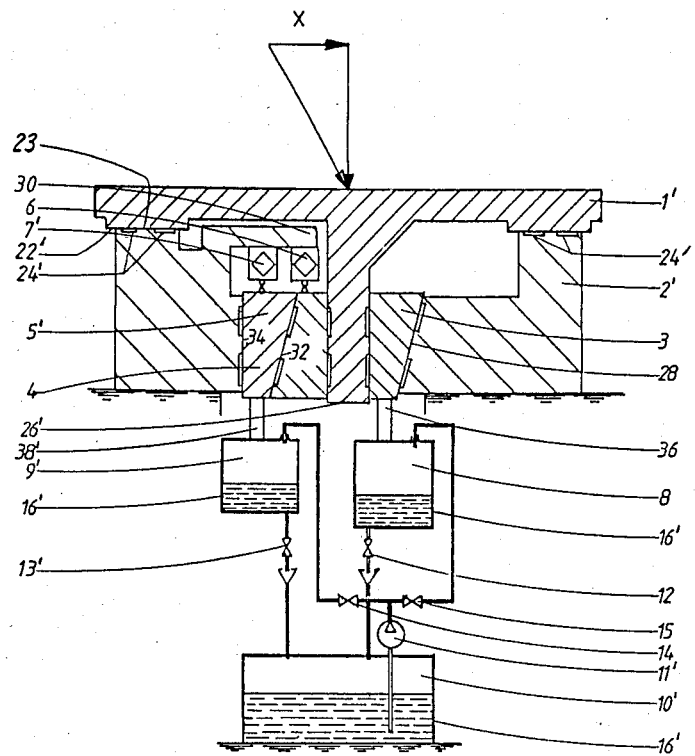
FIG. 3 is a schematic side elevational view of a force measuring apparatus suitable for use in a wind tunnel for measuring a force (component) in a horizontal X or Y direction and having additional functional features.

FIG. 3 shows a third embodiment of the apparatus according to the present invention for measuring a horizontal force (component) in either one direction or the opposite direction and offering further advantages which will be apparent from the description following hereinafter. Using one or preferably two further wedges permits a basic force equalization and a coarse and a fine measurement.

Referring to the drawing, the force measuring apparatus includes a base frame 2' which has an annular horizontal upper surface 23', the surface 23, supporting frictionlessly, by means of hydrostatic bearings 24', a platform 1' at lower surface 22'. The platform 1' is provided with a downwardly extending rod 26' having rectangular, preferably square, cross-section. The force measuring apparatus may be located in a wind tunnel, and an object (not shown) in respect of which horizontal wind forces in the direction X are to be measured is secured to the platform 1'.

The rod 26' is guided between two wedges 3 and 4 in frictionless manner by hydrostatic bearings.

The wedge 3 serves to apply an adjustable bias load to the platform 1', and has its tapered end directed downward, that surface of the wedge remote from the rod 26' being hydrostatically supported at a ramp surface 28 of the base frame 2'.

A measuring wedge 4 is provided on that side of the rod 26' opposite to the bias load wedge 3. The tapered end of the wedge 4 is directed upward and is directly connectd to a coarse measuring device 6, such as a strain gauge measuring device, which is supported by an arm 30 of the base frame 2'.

The coarse measuring wedge 4 is positioned with its ramp surface remote from the rod 26', this surface forming a hydrostatic bearing with a ramp surface 32 of a fine measuring wedge 5'. The vertical surface of the fine measuring wedge 5' is supported by a hydrostatic bearing at a vertical surface 34 of the base frame 2'. The upwardly directed broad end of the fine measuring wedge 5' is directly connected to a fine force measuring device 7', which is supported by the arm 30 of the base frame 2' and which may also be a strain gauge measuring device.

The lower tapered end of the bias load wedge 3 is connected to a bias load device which has a variable mass and by means of which a basic force acting on the platform 1' in the X direction may be compensated. The basic force may, for example, be the average force exerted on the object carried by the platform 1'. Preferably, a bias load container 8 is used as the bias load device, the container 8 being connected by a member 36 to the lower tapered end of the bias load wedge 3. The bias load container 8 may be supplied in a continuous manner with liquid 16 from a tank 10' by a pump via a distribution valve 15, and liquid may be drawn from the container 8 in a continuous manner via a valve 12, the dispensed liquid flowing back into the tank 10'.

The fine measuring wedge 5' has its lowered tapered end connected via a member 38' to a force compensating device which may comprise any suitable variable mass. Preferably, this variable mass is provided by a compensating container 9' to which liquid 16' may be supplied from the tank 10' by means of the pump 11' via a further distribution valve 14. Liquid may be emptied from the container 9' via a vlave 13', the liquid flowing back into the tank 10'.

The fine force measuring device 7' has a narrower measuring range than the coarse force measuring device 6; for example, the fine measuring range may be one tenth of the coarse measuring range. By changing the liquid mass 16' in the compensation container 9', the fine measuring range may be shifted within the total main measuring range.

It should be noted that when using the bias load wedge 3, just one force measuring device having a single measuring wedge may be provided, corresponding to the coarse force measuring device 6 and the coarse measuring wedge 4. In this case, the ramp surface 32 would be formed by a surface of the base frame 2'.

Alternatively, the bias load wedge 3 may be omitted and only the arrangement of the measuring wedges 4, 5' and the force measuring devices 6, 7' may be used, the bias load compensation being accomplished by the compensation container 9'. It should be noted that in this case the apparatus is adapted to measure forces in a direction opposite to the direction X. However, the embodiment described previously having the three wedges 3, 4 and 5' offers a capability of a particularly exact measurement; thus, firstly, the bias load is compensated by the bias load wedge 3, and then there is the additional possibility to shift the fine measuring range by means of the fine measuring wedge 5'.

The operation of the force measuring apparatus will now be described.

First, by supplying an appropriate quantity of liquid 16' from the tank 10' to the bias load container 8, the basic force to be expected in the X direction is compensated such that the expected measured force values will fall within the coarse measuring range of the coarse force measuring device 6. Now forces are applied in the X direction to the object (not shown) secured to the bridge 1'; then, the fine measuring range of the fine force measuring device 7' may be shifted within the coarse measuring range, in accordance with the momentarily applied forces, by supplying liquid 16' to, or dispensing of liquid 16' from, the compensating container 9'.

The apparatus described above may also be used for measuring horizontal forces in a direction Y at right angles to the direction X. For the Y direction, similar wedges and force measuring devices are provided as for the X direction, the bias and coarse measuring wedges for the Y direction being positioned in cooperative relationship with the other vertical surfaces of the rod 26'. However, a single tank 10' and a single pump 11' may be used. The tank 10' may also be used for supplying the liquid for the hydrostatic bearings and for collecting the liquid.

The force transmission ratio of the wedges will depend on the actual circumstances and may range, for instance, between 1:5 and 1:1000. Depending on the force transmission ratio, the basic applied force may be compensated by an extremely small bias load.

As force measuring devices, electrodynamic, piezoelectric, gyrodynamic and filament force measuring devices may also be used.

The force measuring apparatus described above is distinguished by a continuously variable bias load, a direct measuring of the force vectors and a superposable fine measuring range, all combined to form a compact unit. Transmission rods and Watt levers are omitted. The apparatus described has a good rigidity and therefore a high natural frequency.

I claim:

1. An apparatus for measuring a force or force component comprising:
   a force receiving member arranged to have the force (component) applied thereto;
   a base member for guiding in an essentially frictionless manner the force receiving member for movement in the direction of the force (component) to be measured;
   a force measuring device supported on the base member for measuring the force applied to the force receiving member;
   wedge means having opposite first and second surfaces inclined to each other and being guided in an essentially frictionless manner with its first and second surfaces between the force receiving member and the base member for movement in the direction of a wedge axis and acting onto the force measuring device in the direction of the wedge axis, the direction of the force (component) to be measured intersecting at least one of the first and second surfaces at an angle differing from 90°; and
   bias force means acting onto the wedge means at least partially in the direction of the wedge axis.

2. The apparatus of claim 1, wherein said angle is in the range between 30° and 60°.

3. The apparatus of claim 2, wherein said angle is between 40° and 50°.

4. The apparatus of claim 1, wherein the bias force means is coupled to the lower of the first and second surfaces of the wedge means and acts onto the wedge means, the angle between that surface and the direction the bias force means is acting onto the wedge means differing from 90°.

5. The apparatus of claim 4, wherein the bias force means is connected to the center of gravity of the lower of the first and second surfaces of the wedge means.

6. The apparatus of claim 1, wherein hydrostatic bearings are provided between the force receiving member and the base member and the wedge means.

7. The apparatus of claim 1, wherein the force measuring device is connected to the tapered end of the wedge means, the force receiving member engaging, via hydrostatic bearings, the upper surface and the bias force means acting onto the lower surface of the first and second surfaces of the wedge means.

8. The apparatus of claim 1, wherein the force measuring device is connected to that end of the wedge means opposite to the tapered end thereof, the force receiving member engaging, via hydrostatic bearings, the upper surface and the bias force means acting onto the lower surface of the first and second surfaces of the wedge means.

9. The apparatus of claim 1, wherein the bias force means comprises a variable mass.

10. The apparatus of claim 9, wherein the variable mass comprises a container to which liquid may be supplied or from which liquid may be drawn.

11. The apparatus of claim 1, wherein the wedge means includes a first and second wedge means tapered in opposite directions engaging each other in an essentially frictionless manner, the first wedge means being in engagement with the force receiving member and the second wedge means with the base member, at least one of the first and second wedge means being connected to at least one of said force measuring device and a second force measuring device, and at least one of the first and second wedge means having said bias force means or a further bias force means respectively, acting thereon.

12. The apparatus of claim 11, wherein the first wedge means is connected to said force measuring device and said second wedge means is connected to said second force measuring device and to said bias force means.

13. The apparatus of claim 11 or 12, wherein there is provided a third wedge means guided in an essentially frictionless manner between a further surface of the force receiving member and a further surface of the base member and being connected to said further bias force means, such that the third wedge means is acting against the first and second wedge means.

14. The apparatus of claim 11, wherein said bias force means and said further bias force means comprise variable masses.

15. The apparatus of claim 14, wherein the variable masses comprise containers to which liquid may be supplied or from which liquid may be drawn.

16. The apparatus of claim 1, wherein the wedge means includes a first and second wedge means, each being arranged between a surface of the force receiving member and a surface of the base member and acting in opposite directions.

17. The apparatus of claim 11 or 16, wherein the axes of the first and second wedge means are parallel to each other and to the direction of the force (component) to be measured.

18. The apparatus of claim 16, wherein the first wedge means is connected to the force measuring device, whilst the second wedge means is connected to the bias force means, the first and second wedge means being tapered in opposite directions.

19. The apparatus of claim 18, wherein the first wedge means is connected to the force measuring device and each of the first and second wedge means are connected to a separate bias force means.

20. The apparatus of claim 16, wherein said bias force means comprises a variable mass.

21. The apparatus of claim 20, wherein the variable mass comprises a container to which liquid may be supplied or from which liquid may be drawn.

22. The apparatus of claim 10 or claim 21, wherein said liquid is liquid used for supply of hydrostatic bearings provided between said force receiving member, said wedge means and said base member.

23. The apparatus of claim 1, wherein for measuring at least two force (components) perpendicular to each other there is provided a force measuring device, a wedge means and a bias force means for each force (component).

* * * * *